(12) United States Patent
Huang et al.

(10) Patent No.: US 12,156,241 B2
(45) Date of Patent: Nov. 26, 2024

(54) CSI REPORT WITH EXPIRATION TIME

(71) Applicant: QUALCOMM Incorporated, San Diego, CA (US)

(72) Inventors: Yi Huang, San Diego, CA (US); Wei Yang, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,193

(22) Filed: Sep. 20, 2021

(65) Prior Publication Data

US 2022/0124736 A1 Apr. 21, 2022

Related U.S. Application Data

(60) Provisional application No. 63/094,298, filed on Oct. 20, 2020.

(51) Int. Cl.
*H04W 72/54* (2023.01)
*H04L 5/00* (2006.01)
*H04W 72/1263* (2023.01)
*H04W 72/23* (2023.01)

(52) U.S. Cl.
CPC .......... *H04W 72/54* (2023.01); *H04L 5/0051* (2013.01); *H04W 72/1263* (2013.01); *H04W 72/23* (2023.01)

(58) Field of Classification Search
CPC ......... H04W 72/1226; H04W 72/1263; H04W 72/14; H04W 36/0094; H04W 28/12; H04L 5/0051
See application file for complete search history.

(56) References Cited

U.S. PATENT DOCUMENTS 10,674,436 B2 * 6/2020 Dinan ..................... H04L 5/001
2014/0044095 A1 * 2/2014 Li ..................... H04W 72/1215
370/328

(Continued)

FOREIGN PATENT DOCUMENTS

WO WO-2016077701 A1 * 5/2016 ............. H04L 5/001
WO WO-2019001038 A1 * 1/2019 ............... H04B 7/04

(Continued)

*Primary Examiner* — Ian N Moore
*Assistant Examiner* — Latresa A McCallum
(74) *Attorney, Agent, or Firm* — QUALCOMM Incorporated

(57) ABSTRACT

Aspects are provided which allow a UE to provide a CSI report including an expiration time to a base station to reduce the risk of improper scheduling decisions at the base station based on outdated CSI reports. The UE obtains a channel measurement signal from the base station. The UE identifies CSI based on the channel measurement signal and provides a CSI report to the base station including the CSI. The CSI report further includes an expiration time for the CSI report. The base station obtains the CSI report from the UE including the expiration time for the CSI report, and the base station processes downlink data for transmission based on the expiration time in the CSI report.

30 Claims, 12 Drawing Sheets

(56) References Cited

U.S. PATENT DOCUMENTS

| | | | | |
|---|---|---|---|---|
| 2014/0071955 | A1* | 3/2014 | Du | H04L 5/00 370/336 |
| 2016/0149679 | A1* | 5/2016 | Frenne | H04L 5/005 370/329 |
| 2016/0270112 | A1* | 9/2016 | Dinan | H04W 72/21 |
| 2017/0359745 | A1* | 12/2017 | Lee | H04L 5/0048 |
| 2018/0110041 | A1* | 4/2018 | Bendlin | H04L 5/0044 |
| 2019/0207662 | A1* | 7/2019 | Zhou | H04W 72/0446 |
| 2019/0268912 | A1* | 8/2019 | Myung | H04W 72/0446 |
| 2020/0112419 | A1* | 4/2020 | Bagheri | H04L 1/0026 |
| 2020/0274599 | A1* | 8/2020 | Rahman | H04B 7/063 |
| 2020/0281018 | A1* | 9/2020 | Li | H04L 5/0051 |

FOREIGN PATENT DOCUMENTS

| | | | | |
|---|---|---|---|---|
| WO | WO-2019030662 A1 * | 2/2019 | | H04W 52/146 |
| WO | WO-2019120520 A1 * | 6/2019 | | H04L 1/0026 |

* cited by examiner

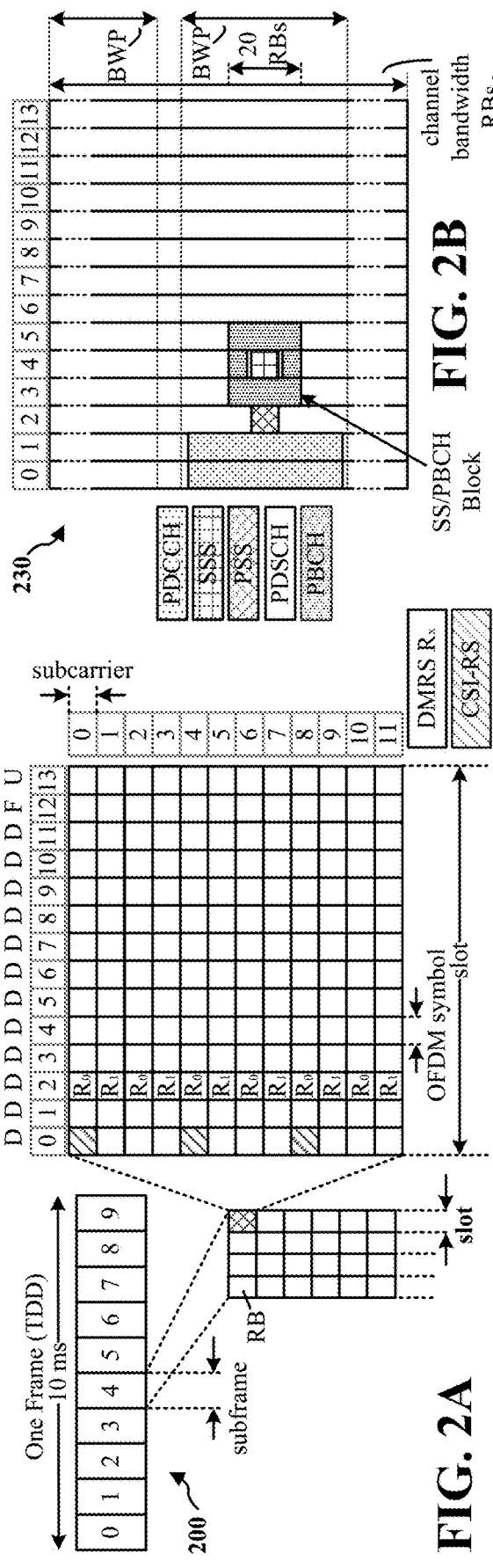
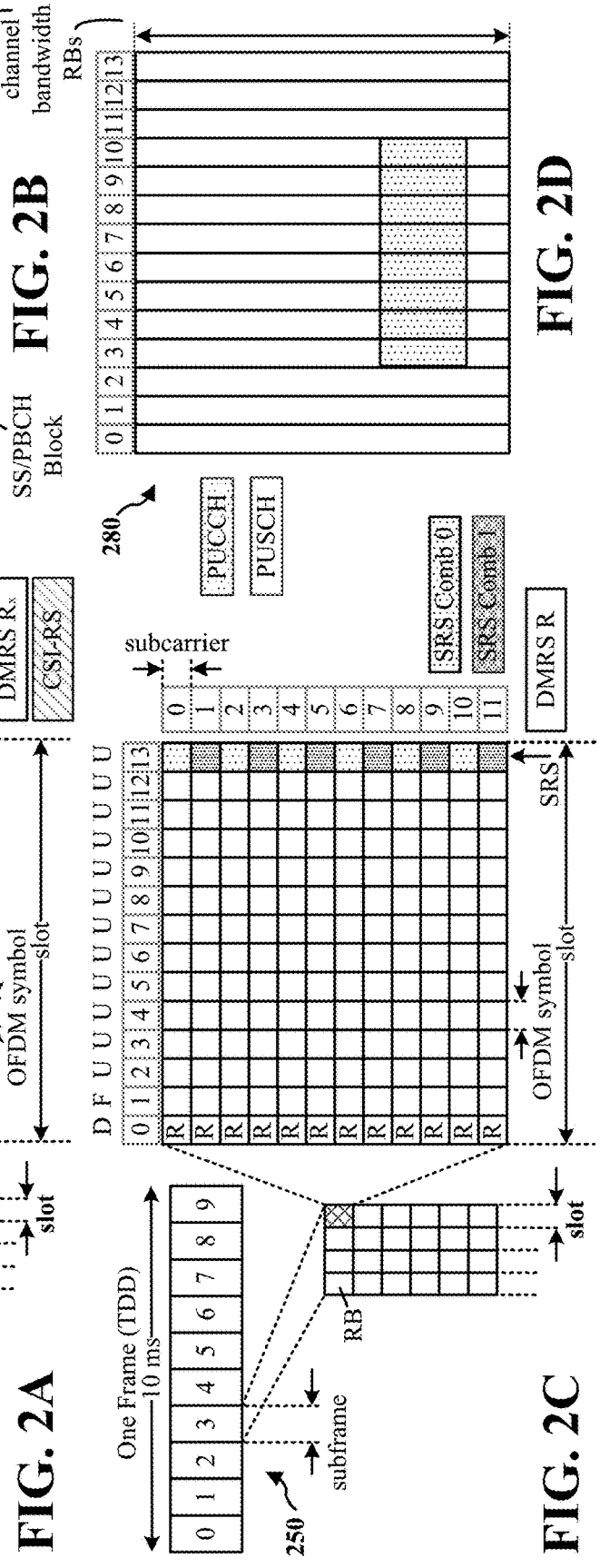

CSI REPORT WITH EXPIRATION TIME

CROSS REFERENCE TO RELATED APPLICATION(S)

This application claims the benefit of U.S. Provisional Application Ser. No. 63/094,298 entitled "CSI REPORT WITH EXPIRATION TIME" and filed on Oct. 20, 2020, the disclosure of which is expressly incorporated by reference herein in its entirety.

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE may obtain a channel measurement signal from a base station, identify channel state information (CSI) based on the channel measurement signal, and provide a CSI report to the base station including the CSI. The CSI report further includes an expiration time for the CSI report.

In an aspect of the disclosure, a method, a computer-readable medium, and an apparatus are provided. The apparatus may be a base station. The base station obtains a CSI report from the UE, where the CSI report further includes an expiration time for the CSI report. The base station processes downlink data for transmission based on the expiration time in the CSI report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
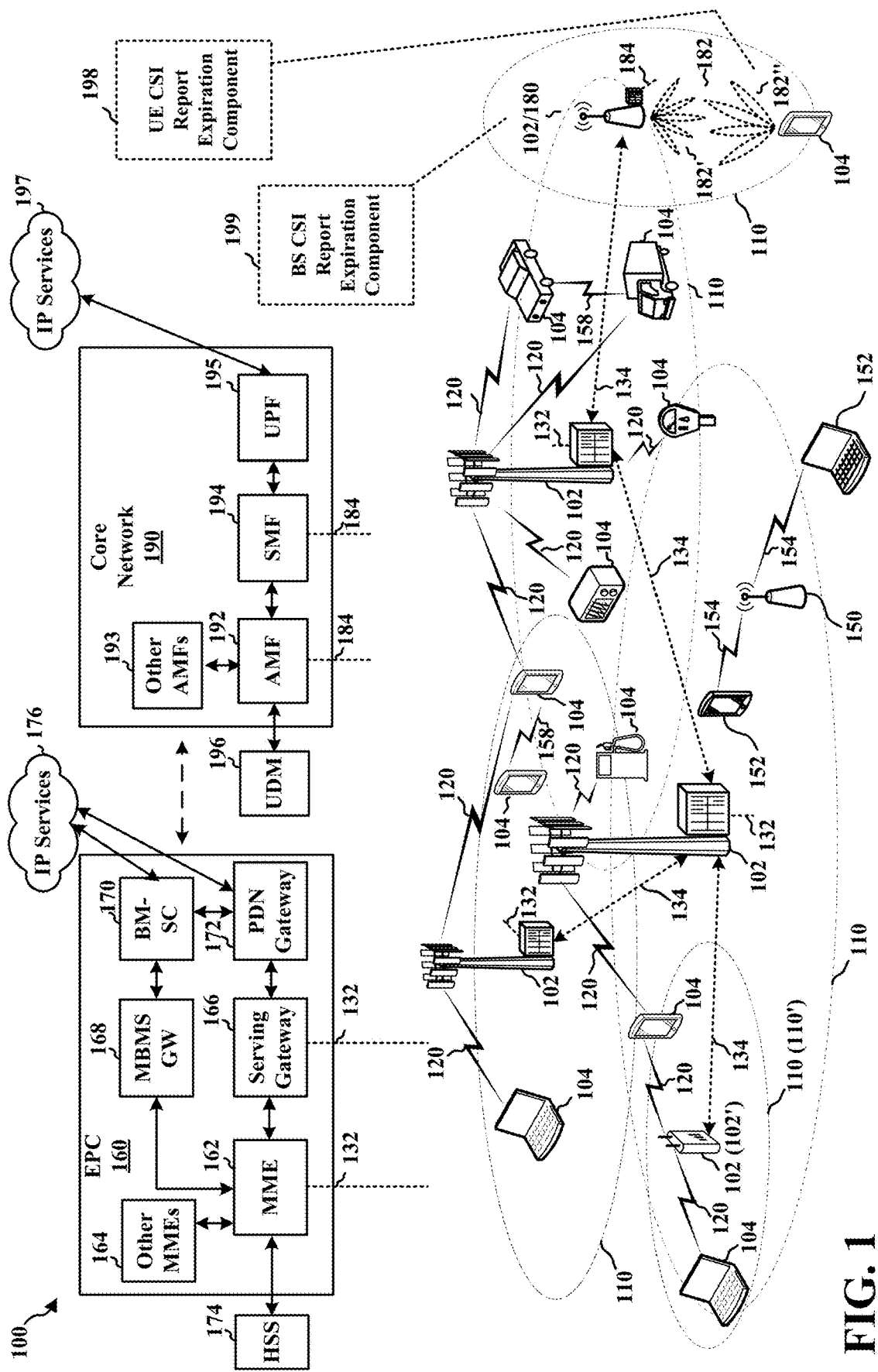
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a UE communicates with a base station over a wireless channel, the UE may measure channel quality and report channel quality measurement results to the base station. For example, the base station may transmit one or more channel state information (CSI) reference signals (CSI-RS) to the UE, and the UE may measure a signal to noise interference ratio (SINR) of the channel based on a reference signal received power (RSRP) or received signal strength indicator (RSSI) of the CSI-RS. The UE may also measure SINR or perform other channel quality measurements based on other signals than CSI-RS, such as demodulation reference signals (DMRS) or other signals on a physical downlink shared channel (PDSCH) that may assist the UE in decoding the PDSCH. The UE may then identify CSI based on the measured RSRP/RSSI/SINR and provide a CSI report to the base station including one or more reporting parameters indicating the channel quality measurement results. For example, the UE may report a channel quality indicator (CQI), a precoding matrix indicator (PMI), a rank indicator (RI), a layer indicator (LI), or other types of CSI (e.g. L1-RSRP, etc.) based on the CSI-RS, DMRS, or other PDSCH signals.

After receiving the CSI report, the base station may transmit a downlink grant which schedules downlink data on PDSCH. The base station may also determine various parameters for the downlink data transmission on PDSCH based on the CSI report (e.g. MCS, rank, resource block allocation, precoder, and transmission power), and the base station may transmit the downlink data accordingly to the UE. For example, if the CSI report includes CQI indicating that the UE determined the channel to have a poor SINR of −3 dB, the base station may determine to decrease the MCS to improve the likelihood of successful reception of the downlink data.

However, when reconfiguring parameters for downlink data transmissions following a CSI report, the base station generally assumes that the channel quality and any interference on the channel does not change significantly between the time the CSI report is received and the time the CSI report is applied. As a result for example, if the base station receives a CSI report including CQI indicating a −3 dB SINR and consequently applies the CSI report by decreasing MCS for a subsequent PDSCH transmission, such decrease in MCS may not be effective if significant interference or channel condition changes occur in the interim which cause the channel quality to decrease even more to −6 dB SINR. For instance, in URLLC, bursts of interference may be likely to arise due to traffic in a neighbor cell, which may likely cause significant changes in interference or channel quality of a serving cell. As a result, the base station may make improper scheduling decisions for subsequent downlink data (e.g. inaccurate MCS, etc.) due to its application of moot or outdated CSI reports.

To reduce the risk of such improper scheduling decisions being made, the UE may determine an expiration time for each CSI report and include the determined expiration time in the corresponding CSI report. Based on this expiration time, the base station may determine whether or not to apply the CSI report when configuring parameters (e.g. MCS, rank, precoder, transmission power, RBs, etc.) for subsequent downlink data. For example, if the downlink data is scheduled to be transmitted prior to the indicated expiration time, the base station may apply the CSI report when determining the various transmission parameters for the downlink data. Otherwise, if the downlink data is scheduled to be transmitted at or after the indicated expiration time, the base station may not apply the CSI report when determining the transmission parameters for the downlink data, and the base station may discard or ignore the CSI report. Instead, the base station may check whether the UE has provided an updated CSI report before the time the downlink data is scheduled. If a more recent CSI report has been received, the base station may apply the updated CSI report. Otherwise, the base station may instead apply default transmission parameters for the downlink data. Such default parameters may be more conservative than the transmission parameters which the base station may have configured based on the CSI report. For example, the base station may select a minimum or low MCS, a maximum transmission power, or other conservative parameters for the subsequent downlink data when an unexpired CSI report has not been received.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction.

The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE CSI report expiration component 198 that is configured to receive a channel measurement signal from a base station, identify CSI based on the channel measurement signal, and provide a CSI report to the base station including the CSI, where the CSI report further includes an expiration time for the CSI report.

Still referring to FIG. 1, in certain aspects, the base station 180 may include a BS CSI report expiration component 199 that is configured to receive a CSI report from the UE, where the CSI report further includes an expiration time for the CSI report, and process downlink data for transmission based on the expiration time in the CSI report.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
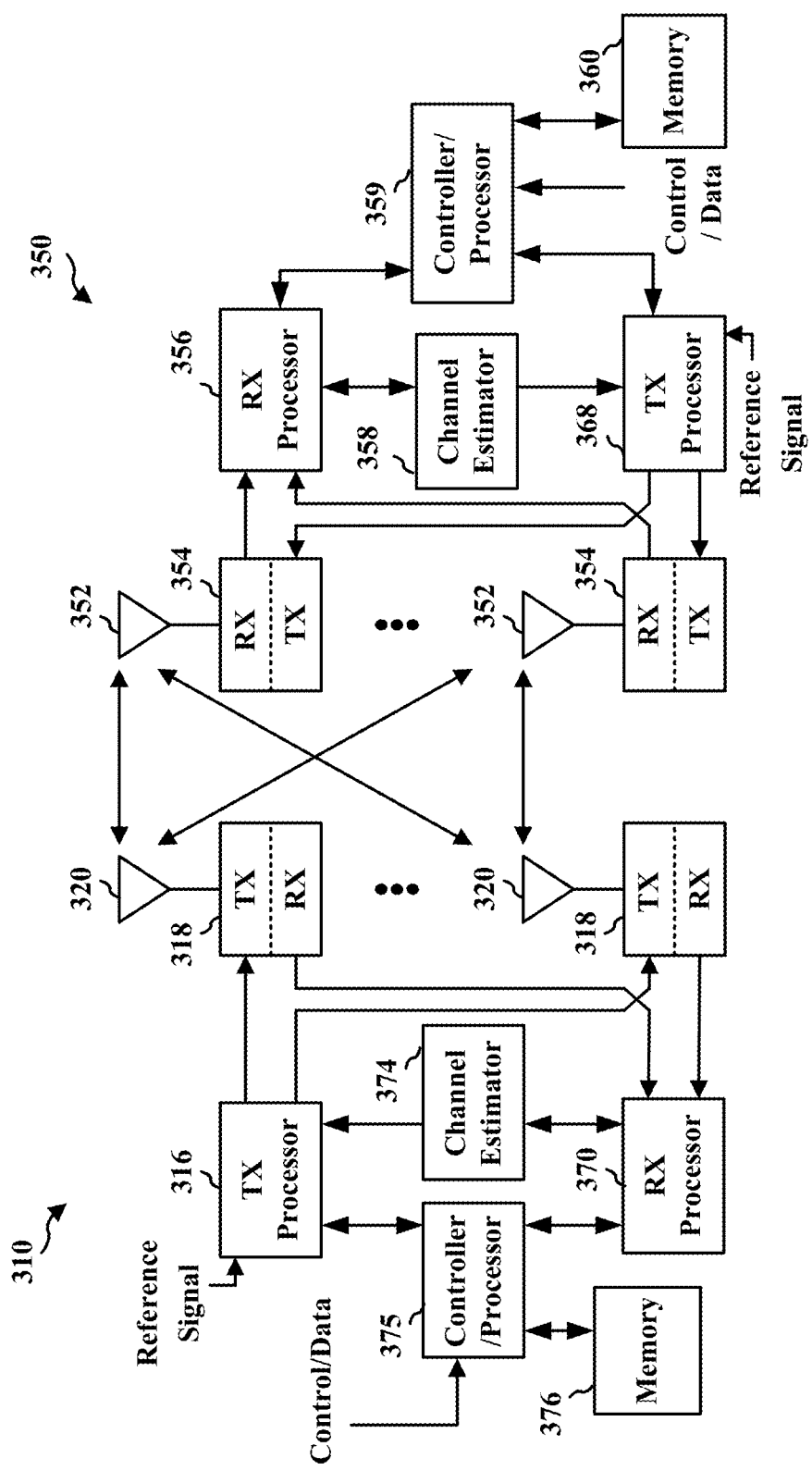
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE CSI report expiration component 198 of FIG. 1.

At least one of the TX processor 316, the RX processor 370, and the controller/processor 375 may be configured to perform aspects in connection with BS CSI report expiration component 199 of FIG. 1.

When a UE communicates with a base station over a wireless channel, the UE may measure channel quality and report channel quality measurement results to the base station. For example, the base station may transmit one or more CSI-RS to the UE, and the UE may measure a SINR of the channel based on RSRP or RSSI of the CSI-RS. The UE may also measure SINR or perform other channel quality measurements based on other signals than CSI-RS, such as DMRS or other signals on a PDSCH that may assist the UE in decoding the PDSCH. The UE may then identify CSI based on the measured RSRP/RSSI/SINR and provide a CSI report to the base station including one or more reporting parameters indicating the channel quality measurement results. For example, the UE may report a CQI, a PMI, a RI, a LI, or other types of CSI (e.g. L1-RSRP, etc.) based on the CSI-RS, DMRS, or other PDSCH signals.

The base station may schedule the UE to provide CSI reports to the base station periodically, semi-persistently, or aperiodically. For example, the base station may transmit a RRC configuration to the UE scheduling periodic CSI-RS transmissions and CSI feedback on PUCCH. In another example, the base station may transmit to the UE a MAC-CE or DCI which triggers semi-persistently scheduled CSI-RS transmissions and CSI feedback. The UE may provide the semi-persistent CSI feedback on PUCCH in response to a MAC-CE or on PUSCH in response to a DCI. In a further example, the base station may transmit an uplink grant to the UE (e.g. a DCI scheduling a PUSCH transmission) which triggers aperiodic CSI-RS transmissions and CSI feedback. The UE may provide the aperiodic CSI feedback on PUSCH in response to the DCI. Additionally, the base station may transmit a downlink grant to the UE (e.g. a DCI scheduling a PDSCH transmission) which triggers aperiodic CSI-RS transmissions and CSI feedback. The UE may provide the aperiodic CSI feedback on PUCCH in response to the DCI.

Figure 4:
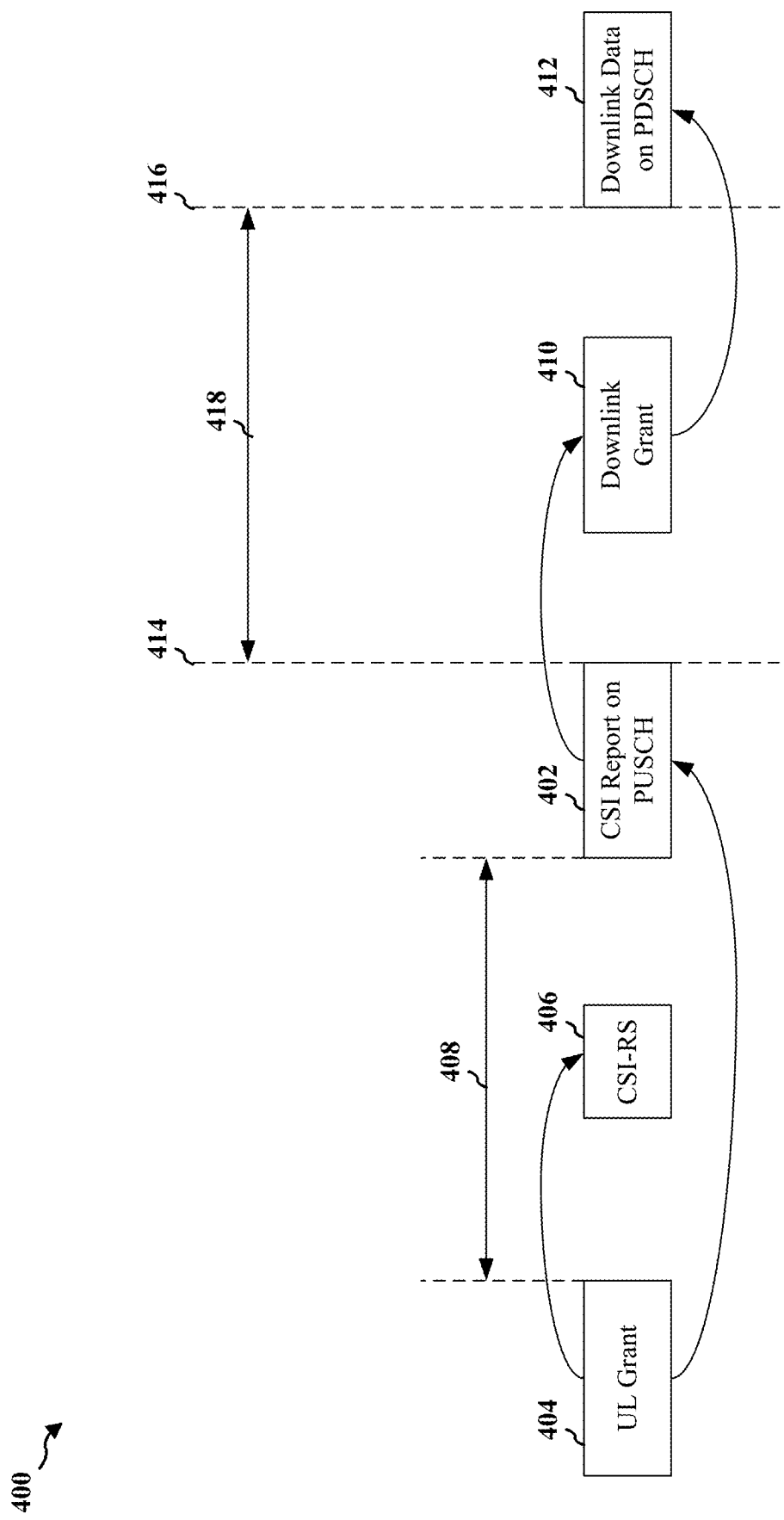
FIG. 4 is a diagram illustrating an example transmission of an aperiodic CSI report in response to an uplink grant.

FIG. 4 illustrates the example 400 where a UE transmits an aperiodic CSI report 402 on PUSCH in response to an uplink grant 404 from a base station. While the following example refers specifically to aperiodic CSI feedback based on CSI-RS, in other examples, the CSI feedback may be aperiodic and based on DMRS or other downlink signals for decoding PDSCH, or the CSI feedback may be periodic or semi-persistent and based on CSI-RS, DMRS, or other downlink signals. In the example of FIG. 4, the UE may first receive uplink grant 404 which triggers aperiodic CSI-RS 406 and which schedules the PUSCH transmission including the aperiodic CSI report 402. The uplink grant 404 may also indicate a slot offset index 408 (e.g. K2), which may indicate the slot at which the UE transmits the PUSCH. The UE may measure CSI based on the aperiodic CSI-RS 406 (for example, by identifying CQI based on the RSRP or RSSI of the CSI-RS), and the UE may provide the CSI to the base station in the aperiodic CSI report 402. After receiving the CSI report, the base station may transmit a downlink grant 410 which schedules downlink data 412 on a PDSCH. The base station may also determine various parameters for the downlink data transmission on PDSCH based on the aperiodic CSI report 402 (e.g. MCS, rank, resource block allocation, precoder, and transmission power), and the base station may transmit the downlink data accordingly to the UE. For example, if the CSI report 402 includes CQI indicating that the UE determined the channel to have a poor SINR of −3 dB, the base station may determine to decrease the MCS to improve the likelihood of successful reception of the downlink data 412.

However, when reconfiguring parameters for downlink data transmissions following a CSI report (e.g. downlink data 412), the base station generally assumes that the channel quality and any interference on the channel does not change significantly between the time the CSI report is received (e.g. reception time 414) and the time the CSI report is applied (e.g. transmission time 416 of downlink data 412). As a result for example, if the base station receives a CSI report at reception time 414 including CQI indicating a −3 dB SINR and consequently applies the CSI report by decreasing MCS for a subsequent PDSCH transmission at transmission time 416, such decrease in MCS may not be effective if significant interference or channel condition changes occur in the time 418 between reception time 414 and transmission time 416. For instance, in URLLC, bursts of interference may be likely to arise due to traffic in a neighbor cell, which may likely cause significant changes in interference or channel quality of a serving cell. For example, during the time 418 between reception time 414 and transmission time 416, a base station in a neighbor cell may transmit bursts of data to its own UEs with frequent on/off patterns or changes in transmission power, thereby reducing the SINR even more (e.g. to −6 dB) and rendering the previous CSI report moot. As a result, the base station may make improper scheduling decisions for subsequent downlink data (e.g. inaccurate MCS, etc.) due to its application of moot or outdated CSI reports.

To reduce the risk of such improper scheduling decisions being made, the UE may determine an expiration time for each CSI report and include the determined expiration time in the corresponding CSI report. Based on this expiration time, the base station may determine whether or not to apply the CSI report when configuring parameters (e.g. MCS, rank, precoder, transmission power, RBs, etc.) for subsequent downlink data. For example, if the downlink data is scheduled to be transmitted prior to the indicated expiration time, the base station may apply the CSI report when determining the various transmission parameters for the downlink data. Otherwise, if the downlink data is scheduled to be transmitted at or after the indicated expiration time, the base station may not apply the CSI report when determining the transmission parameters for the downlink data, and the base station may discard or ignore the CSI report. Instead, the base station may check whether the UE has provided an updated CSI report before the time the downlink data is scheduled. If a more recent CSI report has been received, the base station may apply the updated CSI report. Otherwise, the base station may instead apply default transmission parameters for the downlink data. Such default parameters may be more conservative than the transmission parameters which the base station may have configured based on the CSI report. For example, the base station may select a minimum or low MCS, a maximum transmission power, or other conservative parameters for the subsequent downlink data when an unexpired CSI report has not been received.

Figure 5:
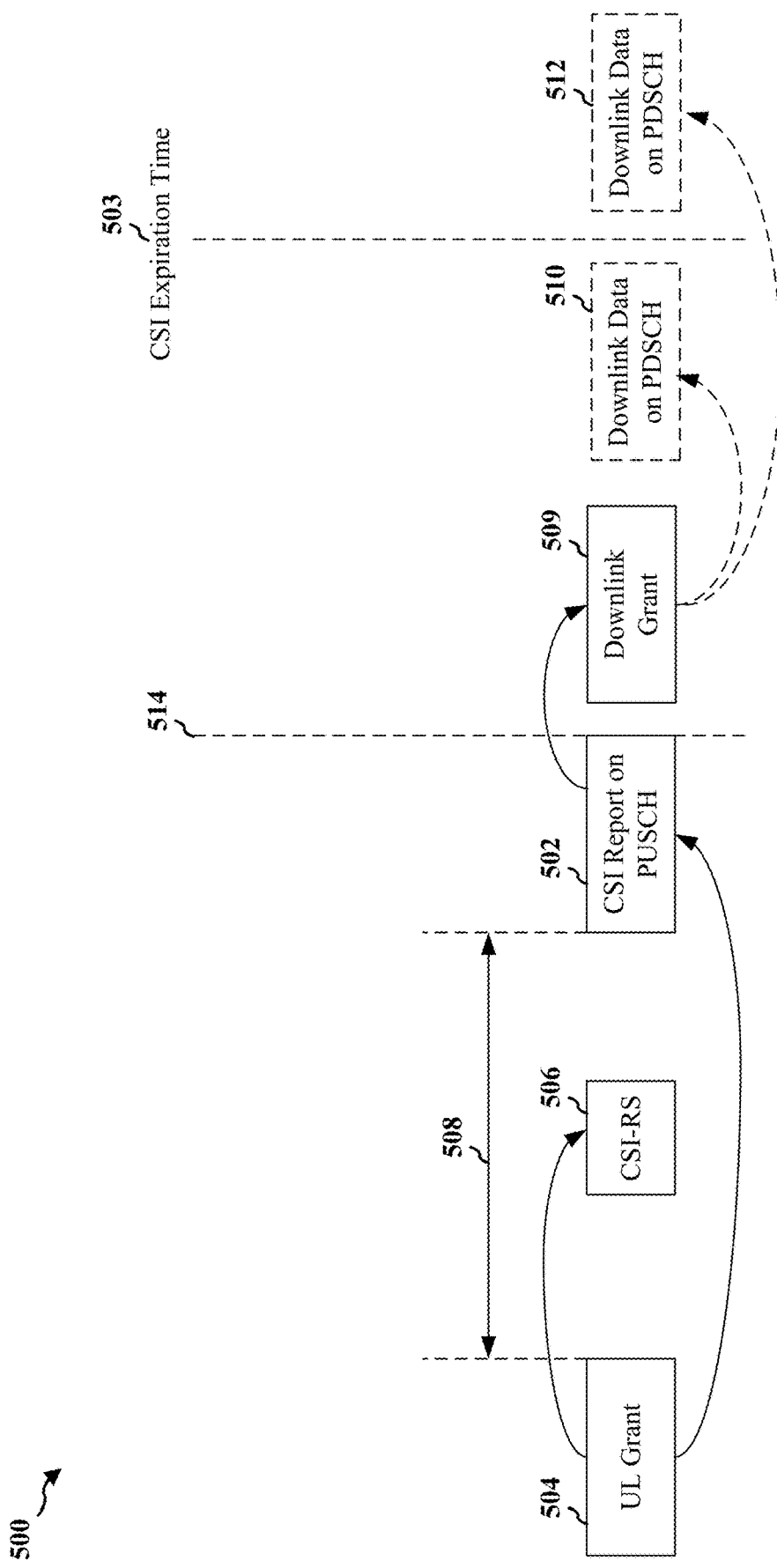
FIG. 5 is a diagram illustrating an example transmission of an aperiodic CSI report including an expiration time for the CSI report.

FIG. 5 illustrates an example 500 where a UE transmits an aperiodic CSI report 502 on PUSCH including an expiration time 503 for the CSI report in response to an uplink grant 504 from a base station. While the following example refers specifically to aperiodic CSI feedback based on CSI-RS, in other examples, the CSI feedback may be aperiodic and based on DMRS or other downlink signals for decoding PDSCH, or the CSI feedback may be periodic or semi-persistent and based on CSI-RS, DMRS, or other downlink signals. Similar to the example of FIG. 4, in this example, the UE may first receive uplink grant 504 which triggers aperiodic CSI-RS 506 and which schedules the PUSCH transmission including the aperiodic CSI report 502. The uplink grant 504 may also indicate a slot offset index 508 (e.g. K2), which may indicate the slot at which the UE transmits the PUSCH. The UE may measure CSI based on the aperiodic CSI-RS 506 (for example, by identifying CQI based on the RSRP or RSSI of the CSI-RS), and the UE may provide the CSI to the base station in the aperiodic CSI report 502. Moreover, in the example of FIG. 5, the UE may determine the expiration time 503 for the CSI report 502, as further described with respect to FIG. 6 below, and include the expiration time in the CSI report. After receiving the CSI report, the base station may transmit a downlink grant 509 which schedules downlink data (e.g. either downlink data 510 or 512) on a PDSCH. Depending on the timing of the scheduled downlink data and the expiration time 503, the base station may apply or discard the CSI report 502 when determining various parameters for the downlink data transmission on PDSCH. For example, if the downlink grant 509 schedules downlink data 510 to occur between the time the CSI report is received (e.g. reception time 514) and the expiration time 503, the base station may reconfigure the MCS, rank, RBs, precoder, transmission power, or other PDSCH transmission parameters based on the CSI report 502. Alternatively, if the downlink grant 509 schedules downlink data 512 to occur after the expiration time 503, and if an updated or more recent CSI report following CSI report 502 has not been received, the base station may refrain from applying the expired CSI report and instead apply the default, conservative parameters when transmitting the downlink data on PDSCH. Thus, the base station may avoid using outdated CSI reports for its scheduling decisions based on the expiration time provided in each CSI report.

The UE may determine the expiration time for a CSI report based on a set of back-to-back interference measurement (IM) resources. For example, the base station may provide a CSI report configuration to the UE which configures consecutive resources for interference measurement, and the base station may transmit an interference measurement signal (e.g. CSI-IM or CSI-RS) in the configured resources from which the UE may derive channel interference measurements to report in CSI. The UE may determine the expiration time for the CSI report by deriving from the IM resources a correlation of interference measurement, and the UE may set the expiration time to the time when the correlation of interference is equal to a threshold. The base station may configure the threshold and provide the threshold to the UE (e.g. in an RRC message).

Figure 6:
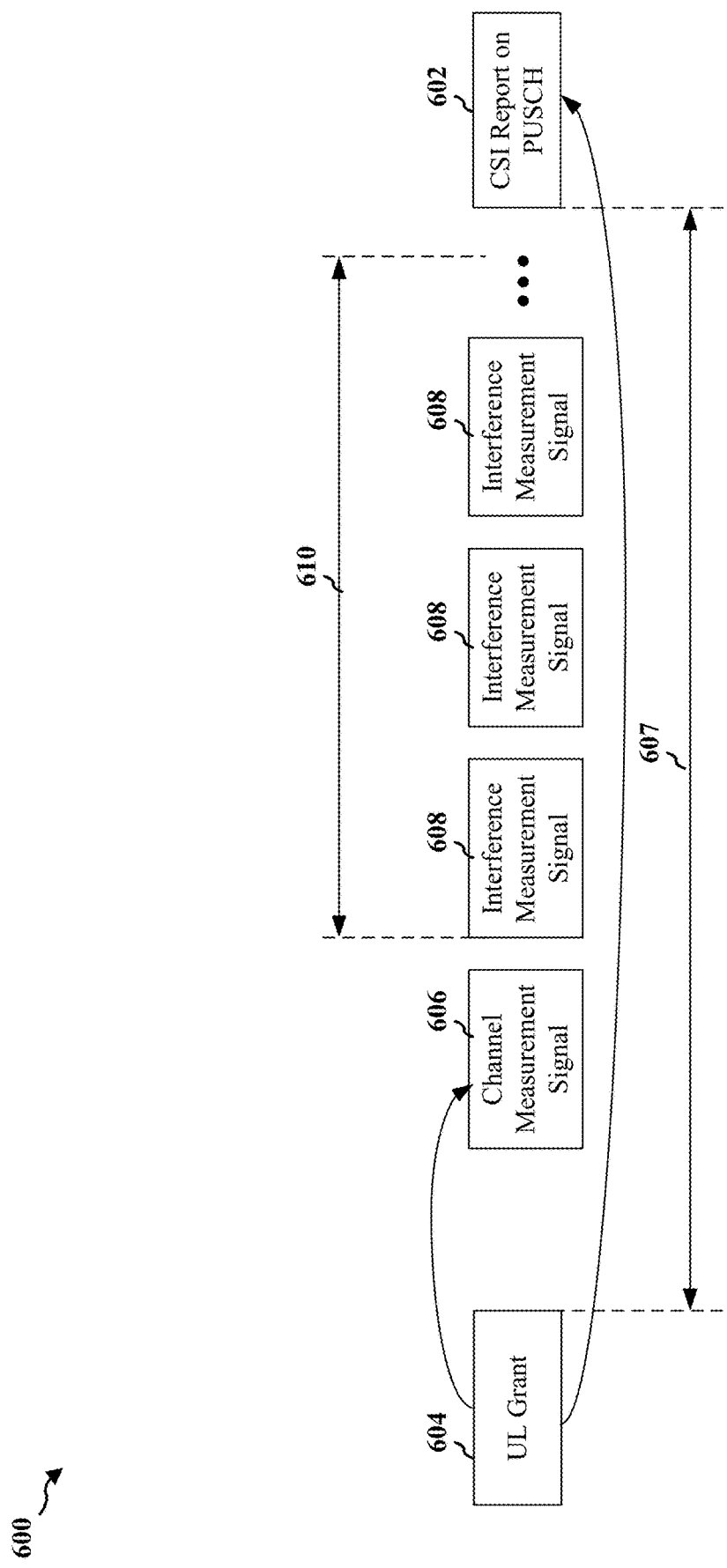
FIG. 6 is a diagram illustrating an example transmission of a CSI report in response to an uplink grant triggering channel measurement and interference measurement signals.

FIG. 6 illustrates an example 600 where a UE transmits a CSI report 602 on PUSCH in response to an uplink grant 604 from a base station. Similar to the examples of FIGS. 4 and 5, the UE may first receive uplink grant 604 which triggers a channel measurement signal 606 (e.g. CSI-RS, DMRS, or another downlink signal for decoding PDSCH other than DMRS) and which schedules the PUSCH transmission including the CSI report 602. The uplink grant 604 may also indicate a slot offset index 607 (e.g. K2), which may indicate the slot at which the UE transmits the PUSCH. Moreover, in the example of FIG. 6, the uplink grant 604 may trigger an interference measurement signal 608 (e.g. CSI-IM or CSI-RS) in consecutive resources which the UE may receive over a period of time 610. While the example of FIG. 6 illustrates three interference measurement signals or resources, in other examples the number of interference measurement signals or resources received by the UE may be different. The UE may measure CSI based on the channel measurement signal 606 and interference measurement signals 608 (for example, by identifying CQI based on the RSRP or RSSI of the CSI-RS and CSI-IM), and the UE may provide the CSI to the base station in the CSI report 602.

After the UE receives the interference measurement signals 608 over the period of time 610 but prior to transmitting the CSI report 602, the UE may calculate a correlation of interference. For example, the correlation of interference may a function $R(\tau)=E[z(t)^*z(t+\tau)'/(\sqrt{V(z(t))}*\sqrt{V(z(t+\tau))})]$, where t represents the time at which an interference measurement signal is received, $\tau$ represents a time delay between consecutive interference measurement signals, $z(t)$ represents an interference measurement of the channel at time t, $z(t+\tau)'$ represents a conjugate of the interference measurement z at time $t+\tau$, E represents an expectation or expected value, $V(z(t))$ and $V(z(t+\tau))$ represent the variance of interference at times t and $t+\tau$ respectively, and R represents the correlation of interference as a function of $\tau$. Thus, the UE may calculate the correlation R by deriving an interference measurement from each of the interference measurement signals 608 and a conjugated interference measurement from each subsequent one of the interference measurement signals 608, dividing each product of interference measurements by the corresponding variance of interference, and computing the expected value of the results over the period of time 610. Alternatively, the UE may calculate the correlation of interference in other ways. Once the UE calculates the correlation of interference as a function of time delay $\tau$, the UE may determine the value of $\tau$ at which the correlation R is equal to a configured threshold (e.g. 0.5 or another value). The UE then sets the determined value $\tau$ as the expiration time for the CSI report 602.

Figure 7:
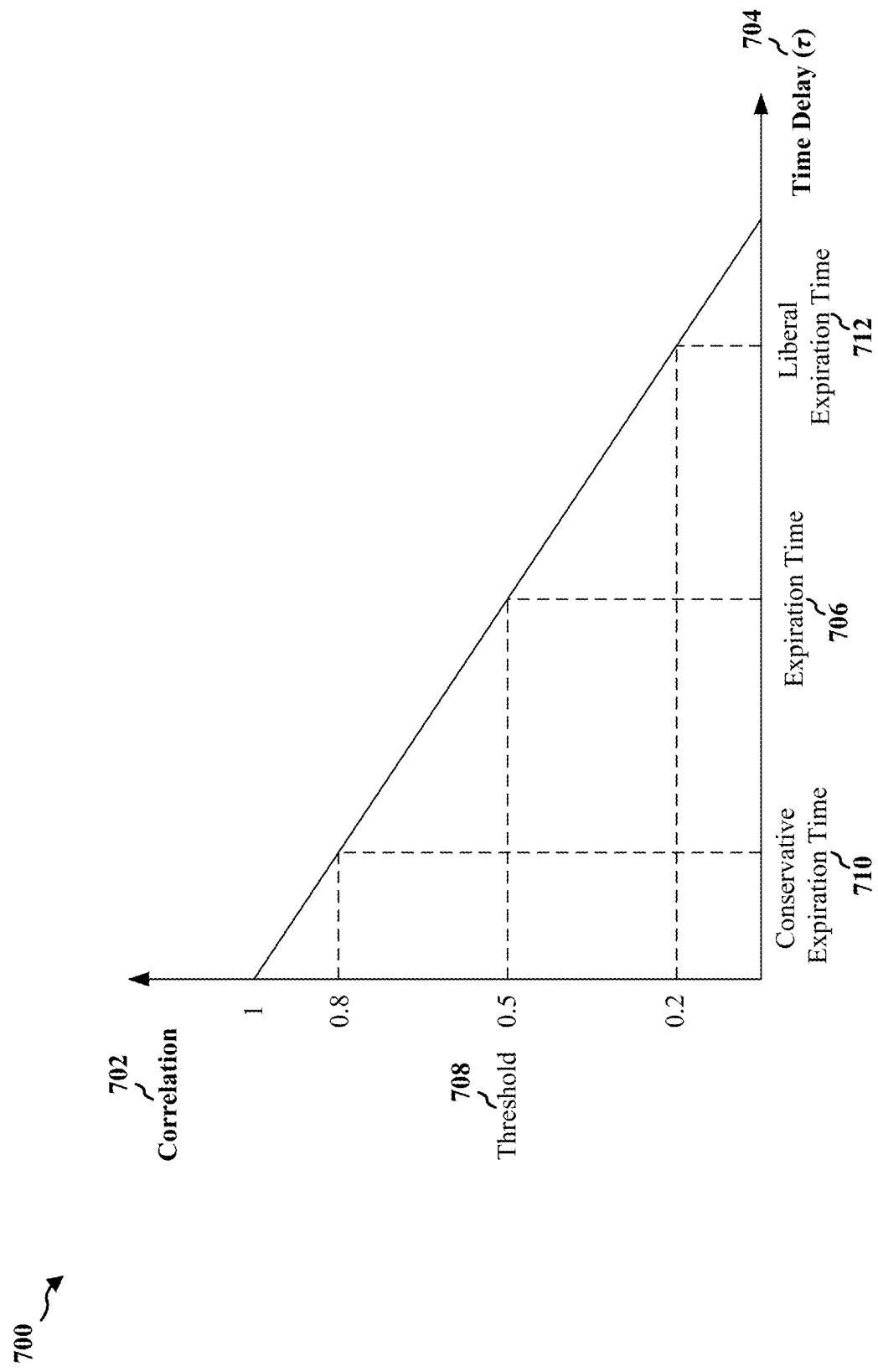
FIG. 7 is a diagram illustrating an example of an interference correlation chart.

FIG. 7 illustrates an example 700 of a chart depicting an interference correlation 702 (e.g. the correlation R) over time 704 (e.g. the time delay $\tau$). As illustrated, the correlation of interference may decrease for longer $\tau$. The UE may determine an expiration time 706 for the CSI report based on a correlation threshold 708. For example, the base station may configure the correlation threshold 708 to be 0.5, in which case the UE may determine the expiration time 706 to be the time delay $\tau$ at which the interference correlation 702 is equal to 0.5. The UE may then include that expiration time 706 in the CSI report and provide that expiration time to the base station. When the base station receives the CSI report, the base station may determine whether or not to apply the CSI report for transmission of subsequent downlink data based on the expiration time as described above.

Moreover, the base station may dynamically change the correlation threshold 708 based on an amount of traffic or interference on the channel. For example, when the base station transmits channel measurement signals and interference measurement signals to the UE, the base station may initially set the correlation threshold 708 to a default, preconfigured value (e.g. 0.5). After the UE determines the expiration time 706 based on the initially set correlation threshold, the UE may then transmit a CSI report including the expiration time as well as CSI indicating the current channel quality and interference. In some cases, the reported expiration time may be sufficient to prevent outdated CSI reports from being improperly applied when the base station configures subsequent downlink transmissions. However, in other cases, the interference on the channel may be significant (there are frequent bursts of traffic in a neighbor cell causing interference to the UE), or the interference on the channel may become more significant over time. In such case, the base station may set the correlation threshold 708 to a higher value so that the UE may determine a conservative expiration time 710 for its CSI reports. For example, the base station may identify from multiple CSI reports (having expiration times 706 based on a correlation threshold of 0.5) that interference has increased over time, and therefore, the base station may increase the threshold to 0.8 to reduce the expiration time and induce the UE to send more frequent CSI reports. Decreasing expiration times in this manner may increase the likelihood of the UE providing more frequent or recent CSI reports to the base station prior to the base station sending a downlink transmission.

Similarly, in certain cases, the interference on the channel may be less significant (there are less frequent bursts of traffic causing interference), or may become less significant over time. As a result, the base station may set the correlation threshold 708 to a lower value corresponding to a liberal expiration time 712 for CSI reporting. For instance, the base station may identify from multiple CSI reports (having expiration times 706 or conservative expiration times 710) that interference has decreased over time, and therefore the base station may decrease the threshold to increase the expiration time and induce the UE to send less frequent CSI reports. Increasing expiration times in this manner may prevent the UE from inefficiently using more power or resources to send frequent CSI reports in cases where the interference may be less significant.

Figure 8:
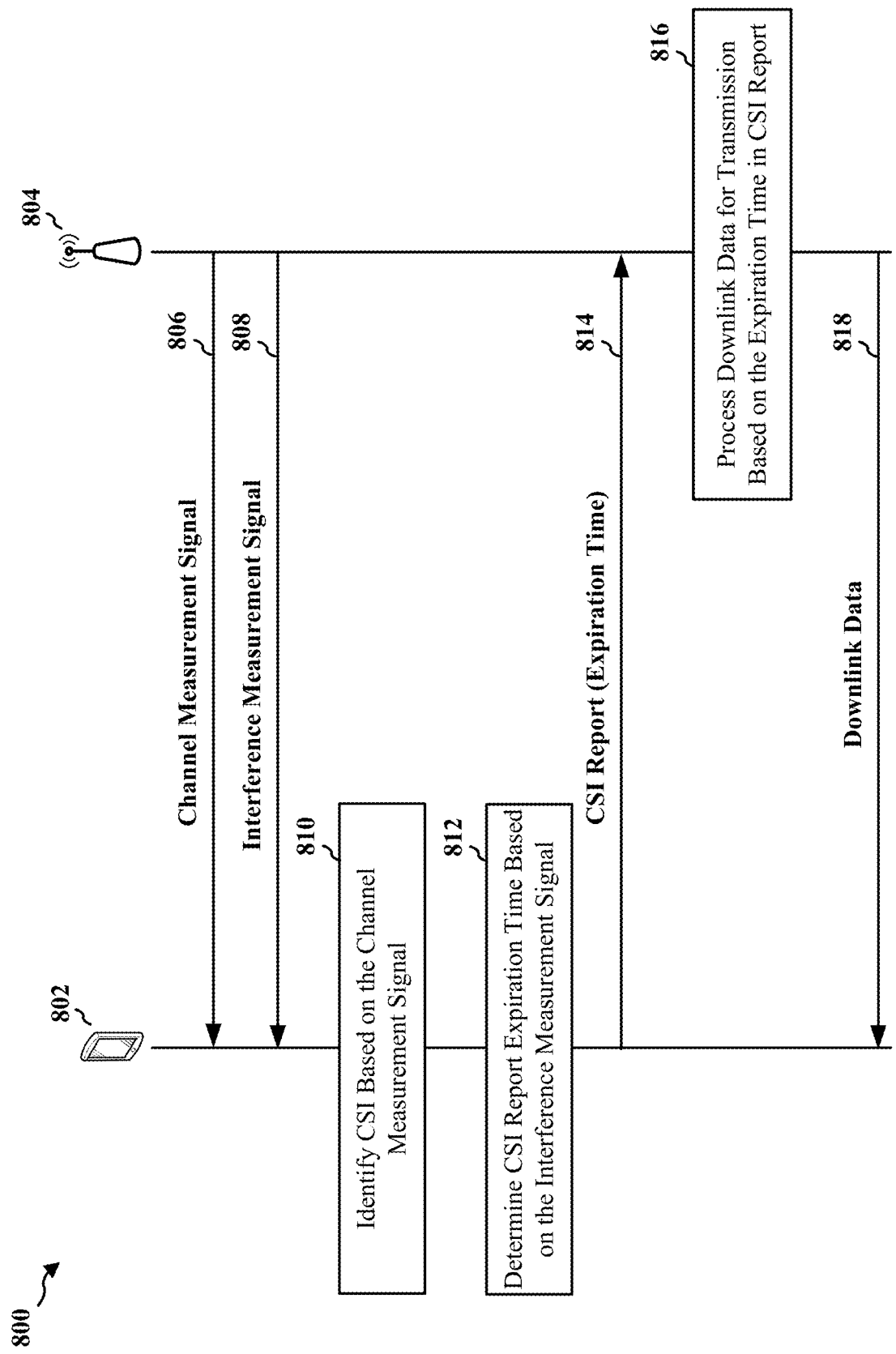
FIG. 8 is a call flow diagram between a UE and a base station.

FIG. 8 illustrates an example 800 of a call flow between a UE 802 and a base station 804. The base station may transmit a channel measurement signal 806 to the UE. For example, referring to FIG. 6, the base station may transmit a channel measurement signal 606 (e.g. CSI-RS, DMRS, or another downlink signal for decoding PDSCH other than DMRS) to the UE from which the UE may derive channel quality measurements. For instance, referring to FIGS. 3, 4 and 5, the base station may transmit CSI-RS 406, 506 to the UE using one or more antennas 320. The base station may also transmit an interference measurement signal 808 to the UE. For example, referring to FIG. 6, the base station may transmit interference measurement signals 608 to the UE (e.g. CSI-IM or CSI-RS) in consecutive resources over a period of time 610. Afterwards, at 810, the UE may identify CSI based on the channel measurement signal. For instance, referring to FIG. 6, the UE may measure CSI based on the channel measurement signal 606. For example, the UE may obtain CQI or other channel quality measurement results based on the RSRP or RSSI of the CSI-RS 406, 506 in FIGS. 4 and 5.

Moreover, at 812, the UE 802 may determine an expiration time for the CSI report based on the interference measurement signal 808 received from the base station 804. For example, referring to FIG. 6, the UE may calculate a correlation of interference R based on the interference measurement signals 608. For instance, the UE may calculate the correlation R by deriving an interference measurement from each of the interference measurement signals 608 and a conjugated interference measurement from each subsequent one of the interference measurement signals 608, dividing each product of interference measurements by the corresponding variance of interference, and computing the expected value of the results over the period of time 610. Alternatively, the UE may calculate the correlation of interference in other ways. Once the UE calculates the correlation of interference, the UE may determine the value of $\tau$ at which the correlation R is equal to a configured threshold (e.g. 0.5 or another value). The UE then sets the determined value $\tau$ as the expiration time for the CSI report 602. For example, referring to FIG. 7, the UE may determine the expiration time 706 for the CSI report to be the time $\tau$ at which the interference correlation 702 is equal to the correlation threshold 708 configured by the base station. The base station may dynamically change the correlation threshold 708 based on an amount of traffic or interference on the channel to result in the UE determining different expiration times (e.g. conservative expiration time 710 or liberal expiration time 712).

After the UE 802 identifies the CSI at 810 and determines the expiration time for the CSI report at 812, the UE provides a CSI report 814 including the expiration time to the base station 804. For instance, referring to FIG. 3, the UE may transmit CSI report 814 including the expiration time to the base station 804 using one or more antennas 352. Then, at 816, the base station processes downlink data 818 for transmission based on the expiration time in the CSI report. For example, referring to FIG. 5, after receiving the CSI report 502 including expiration time 503, the base station may transmit downlink grant 509 which schedules downlink data (e.g. either downlink data 510 or 512) on PDSCH. Depending on the timing of the scheduled downlink data and the expiration time 503, the base station may apply or discard the CSI report when determining various parameters for the downlink data transmission. For example, if the downlink grant 509 schedules downlink data 510 to occur between the time the CSI report is received (e.g. reception time 514) and the expiration time 503, the base station may reconfigure the MCS, rank, RBs, precoder, transmission power, or other PDSCH transmission parameters for the downlink data based on the CSI report 502. Alternatively, if the downlink grant 509 schedules downlink data 512 to occur after the expiration time 503, and assuming that no updated or more recent CSI report has been received, the base station may refrain from applying the expired CSI report and instead apply default, conservative parameters (e.g. a minimum or low MCS or a maximum transmission power) when transmitting the downlink data on PDSCH. The base station may then transmit the downlink data 818 accordingly.

Figure 9:
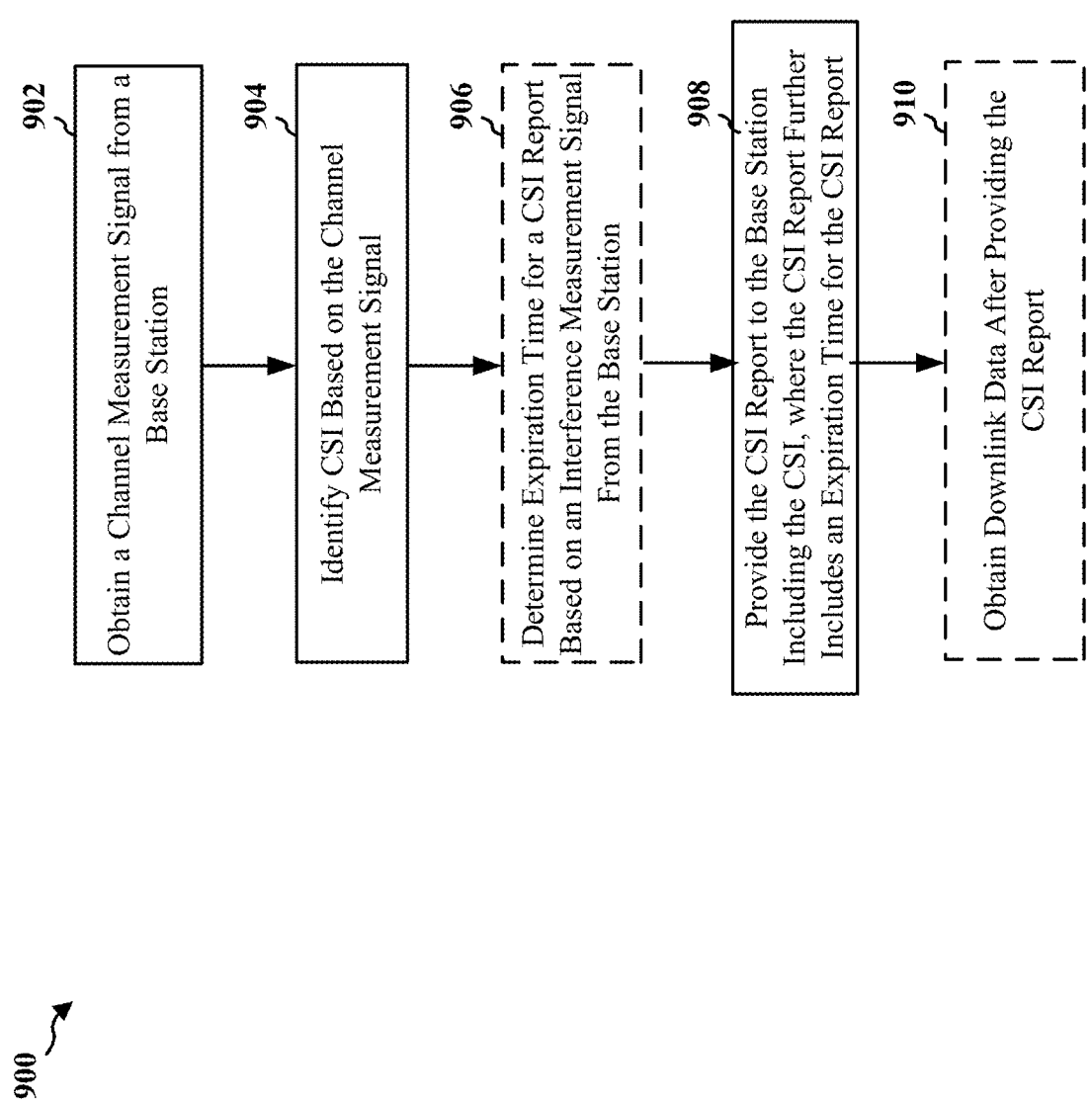
FIG. 9 is a flowchart of a method of wireless communication.

FIG. 9 is a flowchart 900 of a method of wireless communication. The method may be performed by a UE (e.g., the UE 104, 350, 802; the apparatus 1002). Optional aspects are illustrated in dashed lines. The method allows a UE to provide a CSI report including an expiration time to the base station to reduce the risk of improper scheduling decisions at the base station based on outdated CSI reports (e.g. in cases where significant changes in interference may arise such as in URLLC).

At 902, the UE obtains a channel measurement signal from a base station. For example, 902 may be performed by channel measurement signal component 1040. For instance, referring to FIG. 8, the UE 802 may receive channel measurement signal 806 from base station 804. The channel measurement signal may comprise one of CSI-RS (e.g. CSI-RS 406, 506 of FIGS. 4 and 5), DMRS, or a signal on a PDSCH. For example, referring to FIG. 3, the RX processor 356 of UE 350 may receive data including the CSI-RS from base station 310 using one or more antennas 352, and the controller/processor 359 of UE 350 may demodulate the received data from RX processor 356 to obtain the CSI-RS.

At 904, the UE identifies CSI based on the channel measurement signal. For example, 904 may be performed by CSI component 1042. For instance, referring to FIG. 8, at 810, the UE 802 may identify CSI based on the channel measurement signal 806. For example, referring to FIGS. 3-6, the RX processor 356 or controller/processor 359 of UE 350 may measure RSRP or RSSI of the channel measurement signal 606 obtained from the base station 310 (e.g., the CSI-RS 406, 506), and the controller/processor of the UE may determine CQI or other CSI parameters (e.g., RI, PMI, etc.) from the channel quality measurements.

At 906, the UE may determine an expiration time for a CSI report based on an IM signal from the base station. For example, 906 may be performed by expiration time component 1044. For instance, referring to FIG. 8, at 812, the UE 802 may determine an expiration time (e.g. expiration time 706, 710 or 712 in FIG. 7) for CSI report 814 based on an interference measurement signal 808 (e.g., CSI-IM or CSI-RS) received from base station 804. For example, the expiration time may be determined based on a correlation of interference (e.g. interference correlation 702 in FIG. 7) in relation to a threshold (e.g. correlation threshold 708), where the correlation of interference is a function of at least an interference measurement of the channel at a time when the interference measurement signal is received. For instance, the expiration time may be determined to be a time where the correlation of interference is equal to the threshold (e.g. as illustrated in FIG. 7). As an example, the UE may calculate the interference correlation 702 by deriving an interference measurement from each of the interference measurement signals 608 and a conjugated interference measurement from each subsequent one of the interference measurement signals 608, dividing each product of interference measurements by the corresponding variance of interference, and computing the expected value of the results over the period of time 610. Alternatively, the UE may calculate the correlation of interference in other ways. Once the UE calculates the correlation of interference as a function of time delay τ, the UE may determine the value of τ at which the correlation R is equal to a configured threshold (e.g. 0.5 or another value). The UE may then set the determined value τ as the expiration time for the CSI report 602.

At 908, the UE provides the CSI report to the base station including the CSI, where the CSI report further includes an expiration time for the CSI report. For example, 908 may be performed by CSI report component 1046. For instance, referring to FIG. 8, the UE 802 may provide CSI report 814 to the base station 804 including the expiration time (e.g. expiration time 706, 710, 712) determined at 812. For example, referring to FIG. 3, the controller/processor 359 of UE 350 may modulate data including the CSI report and provide the modulated data to the TX processor 368, which in turn may transmit the modulated data including the CSI report to the base station 310 using one or more antennas 352. In various examples, the CSI report may be provided periodically on a PUCCH, semi-persistently on one of the PUCCH or a PUSCH, or aperiodically on the PUSCH in response to an uplink grant (such as illustrated in FIGS. 4 and 5). In another example, the CSI report may be provided aperiodically on a PUCCH in response to a downlink grant.

Finally, at 910, the UE may obtain downlink data after providing the CSI report. For example, 910 may be performed by downlink data component 1048. For instance, referring to FIG. 8, the UE 802 may receive downlink data 818 from the base station 804 after providing the CSI report 814. For example, referring to FIG. 3, the RX processor 356 of UE 350 may receive downlink data from base station 310 using one or more antennas 352, and the controller/processor 359 of UE 350 may demodulate the received data from RX processor 356 to obtain the downlink data. In one example, the downlink data may be obtained based on the CSI report when a difference between a base station reception time of the CSI report (e.g. reception time 414, 514) and a base station transmission time of the downlink data (e.g. transmission time 416) does not exceed the expiration time. For instance, referring to FIG. 5, if the CSI report has not expired by the time the downlink data is transmitted, downlink data 510 may be received with a configured MCS, rank, RB allocation, precoder, transmission power, or other PDSCH transmission parameters which the base station may apply based on the provided CSI report. In another example, the downlink data may be obtained based on parameters other than in the CSI report when a difference between a base station reception time of the CSI report (e.g. reception time 414, 514) and a base station transmission time of the downlink data (e.g. transmission time 416) meets or exceeds the expiration time. For instance, referring to FIG. 5, if the CSI report has expired before the downlink data is transmitted, downlink data 512 may be received with a minimum or low MCS, a maximum transmission power, or other conservative transmission parameters which the base station may apply by default rather than based on the expired CSI report.

Figure 10:
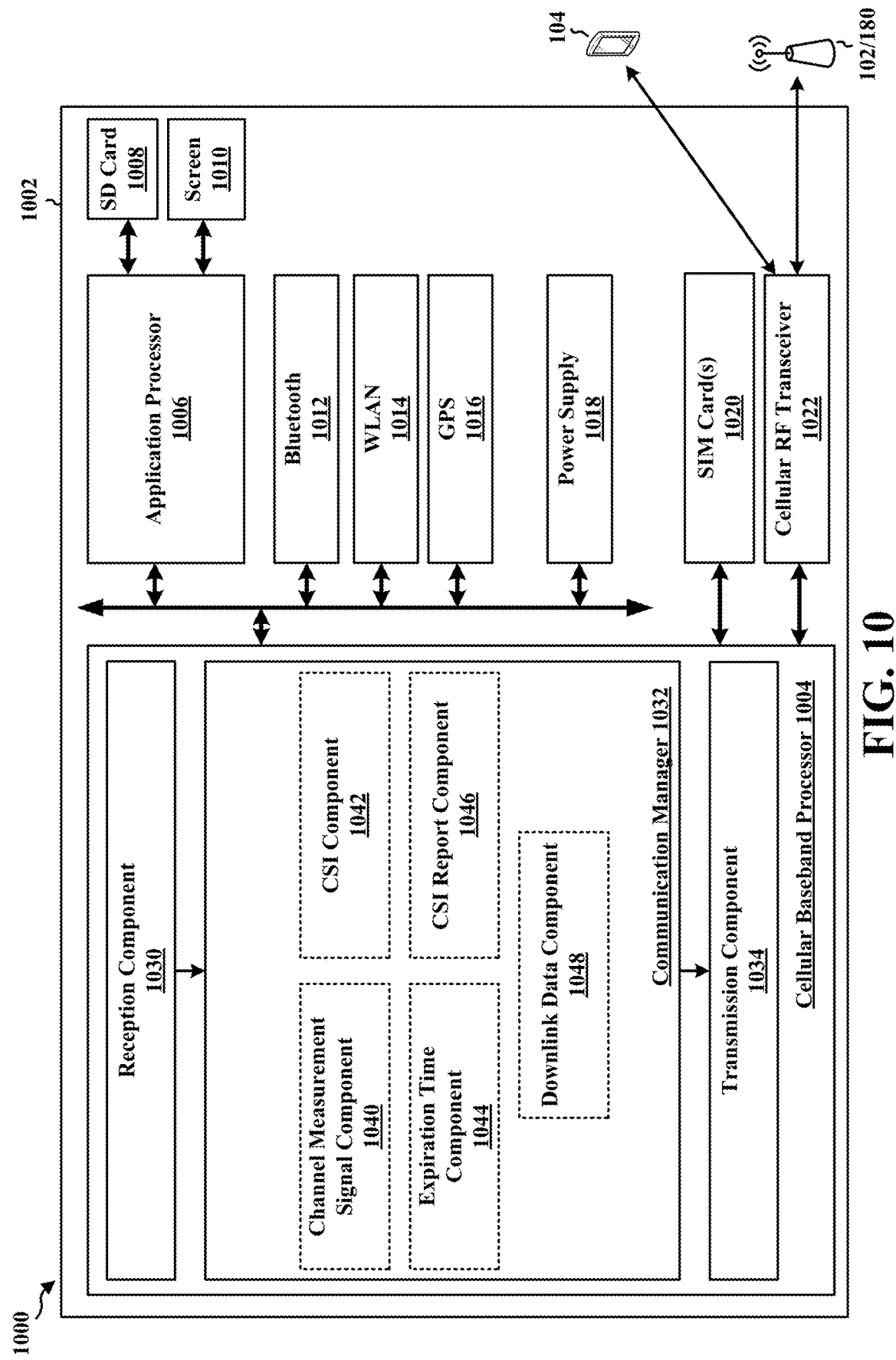
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a channel measurement signal component 1040 that is configured to obtain a channel measurement signal from a base station, e.g., as described in connection with 902. The channel measurement signal component may also be configured to obtain an IM signal from the base station. The communication manager 1032 further includes a CSI component 1042 that receives input in the form of the channel measurement signal from the channel measurement signal component 1040 and is configured to identify CSI based on the channel measurement signal, e.g., as described in connection with 904. The communication manager 1032 further includes an expiration time component 1044 that receives input in the form of the IM signal from the channel measurement signal component 1040 and is configured to determine an expiration time based on an IM signal from the base station, e.g., as described in connection with 906. The communication manager 1032 further includes a CSI report component 1046 that receives input in the form of CSI from the CSI component 1042 and is configured to provide a CSI report to the base station including the CSI, where the CSI report further includes the expiration time for the CSI report, e.g., as described in connection with 908. The communication manager 1032 further includes a downlink data component 1048 that receives input in the form of the CSI report from the CSI report component 1046 and is configured to obtain downlink data after providing the CSI report, e.g., as described in connection with 910.

The apparatus may include additional components that perform each of the blocks of the algorithm in the aforementioned flowcharts of FIGS. 8 and 9. As such, each block in the aforementioned flowchart of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for obtaining a channel measurement signal from a base station; means for identifying CSI based on the channel measurement signal; and means for providing a CSI report to the base station including the CSI, wherein the CSI report further includes an expiration time for the CSI report.

In one configuration, the apparatus 1002, and in particular the cellular baseband processor 1004, may include means for obtaining downlink data after providing the CSI report.

In one configuration, the apparatus 1002, and in particular the cellular baseband processor 1004, may include means for determining the expiration time based on an IM signal from the base station.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
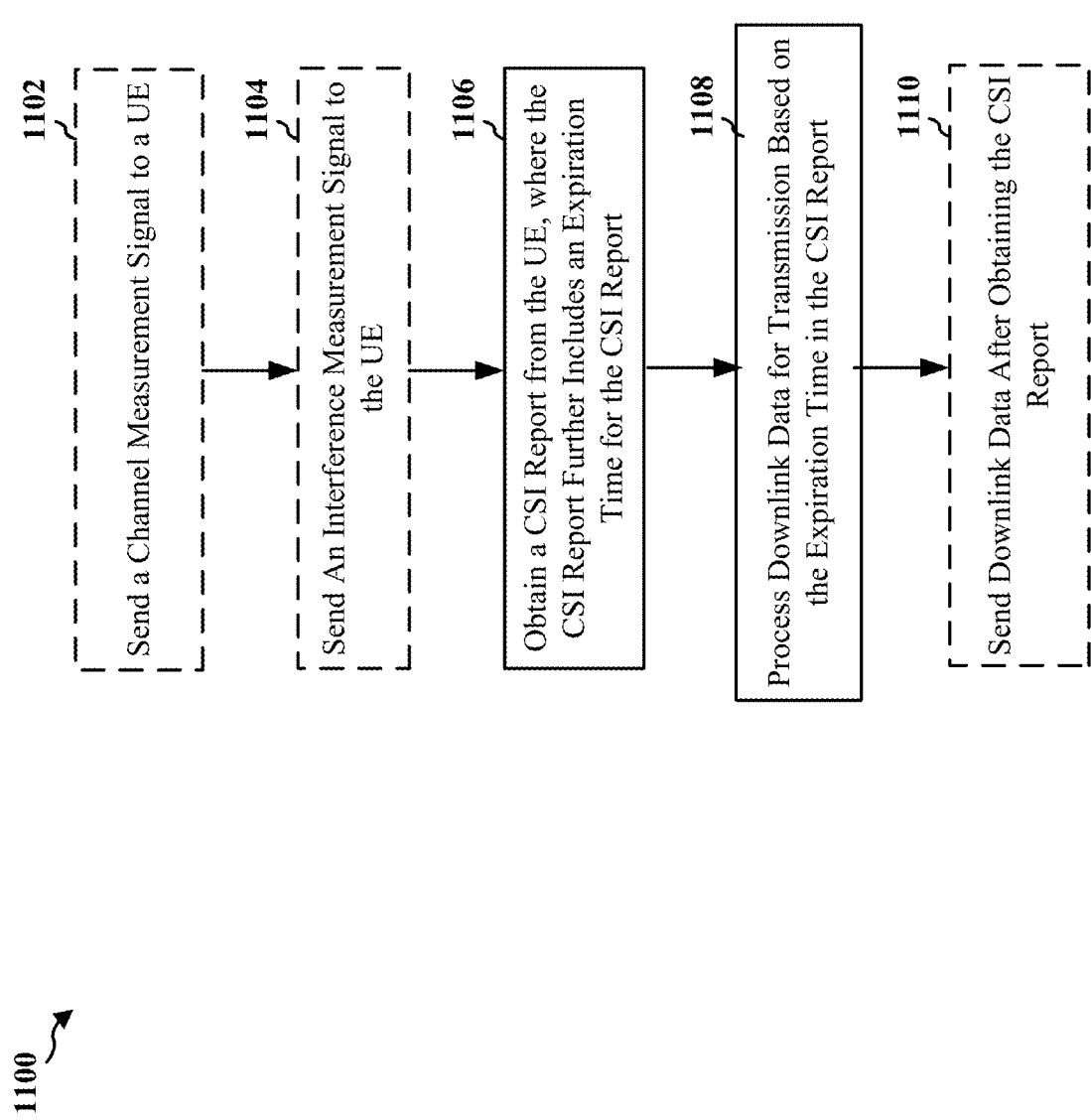
FIG. 11 is a flowchart of a method of wireless communication.

FIG. 11 is a flowchart 1100 of a method of wireless communication. The method may be performed by a base station (e.g., the base station 102/180, 310, 804; the apparatus 1202). Optional aspects are illustrated in dashed lines. The method allows a base station to consider an expiration time of a CSI report when processing downlink data for transmission to a UE, thus reducing the risk of improper scheduling decisions at the base station based on outdated CSI reports (e.g. in cases where significant changes in interference may arise such as in URLLC).

At 1102, the base station may send a channel measurement signal to the UE. For example, 1102 may be performed by channel measurement signal component 1240. The channel measurement signal may comprise one of CSI-RS, DMRS, or a signal on a PDSCH. For instance, referring to FIG. 8, the base station 804 may transmit channel measurement signal 806 to UE 802. The channel measurement signal may comprise one of CSI-RS (e.g. CSI-RS 406, 506 of FIGS. 4 and 5), DMRS, or a signal on a PDSCH. For example, referring to FIG. 3, the controller/processor 375 of base station 310 may modulate data including the CSI-RS, DMRS, or PDSCH signal other than DMRS and provide the modulated data to the TX processor 316, which in turn may transmit the modulated data including the CSI-RS, DMRS, or PDSCH signal other than DMRS to the UE 350 using one or more antennas 320.

At 1104, the base station may send an IM signal to the UE. For example, 1104 may be performed by interference measurement signal component 1242. For instance, referring to FIG. 8, the base station 804 may transmit an interference measurement signal 808 to the UE 802. For example, referring to FIG. 3, the controller/processor 375 of base station 310 may modulate data including a CSI-IM or CSI-RS and provide the modulated data to the TX processor 316, which in turn may transmit the modulated data including the CSI-IM or CSI-RS to the UE 350 using one or more antennas 320. Also, referring to FIG. 6, the base station may transmit interference measurement signals 608 to the UE (e.g. CSI-IM or CSI-RS) in consecutive resources over a period of time 610.

At 1106, the base station obtains a CSI report from the UE, where the CSI report further includes an expiration time for the CSI report. For example, 1106 may be performed by CSI report component 1244. For instance, referring to FIG. 8, the base station 804 may receive CSI report 814 from the UE 802 including an expiration time for the CSI report (e.g. expiration time 706, 710, 712). For example, referring to FIG. 3, the RX processor 370 of base station 310 may receive data including the CSI report and expiration time from UE 350 using one or more antennas 320, and the controller/processor 375 of base station 310 may demodulate the received data from RX processor 370 to obtain the CSI report and expiration time. The CSI report may include CSI based on the channel measurement signal transmitted at 1102. In one example, the CSI report may be obtained periodically on a PUCCH, semi-persistently on one of the PUCCH or a PUSCH, or aperiodically on the PUSCH in response to an uplink grant (such as illustrated in FIGS. 4 and 5). In another example, the CSI report may be obtained aperiodically on a PUCCH in response to a downlink grant.

The expiration time for the CSI report may be based on the IM signal sent at 1104. For instance, referring to FIG. 8, the expiration time (e.g. expiration time 706, 710, 712 in FIG. 7) may be based on the interference measurement signal 808 (e.g., CSI-IM or CSI-RS) transmitted from the base station 804. For example, the expiration time may be based on a correlation of interference (e.g. interference correlation 702 in FIG. 7) in relation to a threshold (e.g. correlation threshold 708), where the correlation of interference is a function of at least an interference measurement of the channel at a time when the interference measurement signal is transmitted. For instance, the expiration time may be a time where the correlation of interference is equal to the threshold (e.g. as illustrated in FIG. 7).

At 1108, the base station processes downlink data for transmission based on the expiration time in the CSI report. For example, 1108 may be performed by process component 1246. For instance, referring to FIG. 8, at 816, the base station may process downlink data 818 for transmission to the UE based on the expiration time in the CSI report 814. In one example, the downlink data may be processed based on the CSI report received at 1106 when a difference between a base station reception time of the CSI report (e.g. reception time 414, 514) and a base station transmission time of the downlink data (e.g. transmission time 416) does not exceed the expiration time. For instance, referring to FIG. 5, if the base station determines that the CSI report will not yet expire by the time the downlink data is scheduled to be transmitted, the base station may apply a configured MCS, rank, RB allocation, precoder, transmission power, or other PDSCH transmission parameters based on the received CSI report when transmitting downlink data 510. In another example, the downlink data may be processed based on parameters other than in the CSI report when a difference between a base station reception time of the CSI report (e.g. reception time 414, 514) and a base station transmission time of the downlink data (e.g. transmission time 416) meets or exceeds the expiration time. For instance, referring to FIG. 5, if the base station determines that the CSI report will expire by the time the downlink data is scheduled to be transmitted, the base station may apply a minimum or low MCS, a maximum transmission power, or other conservative transmission parameters by default, rather than based on the expired CSI report, when transmitting downlink data 512.

Finally, at 1110, the base station may send the downlink data after obtaining the CSI report at 1106. For example, 1110 may be performed by downlink data component 1248. For instance, referring to FIG. 8, the base station 804 may transmit downlink data 818 to the UE 802 after receiving the CSI report 814. For example, referring to FIG. 3, the controller/processor 375 of base station 310 may modulate a downlink data and provide the modulated data to the TX processor 316, which in turn may transmit the modulated, downlink data to the UE 350 using one or more antennas 320.

Figure 12:
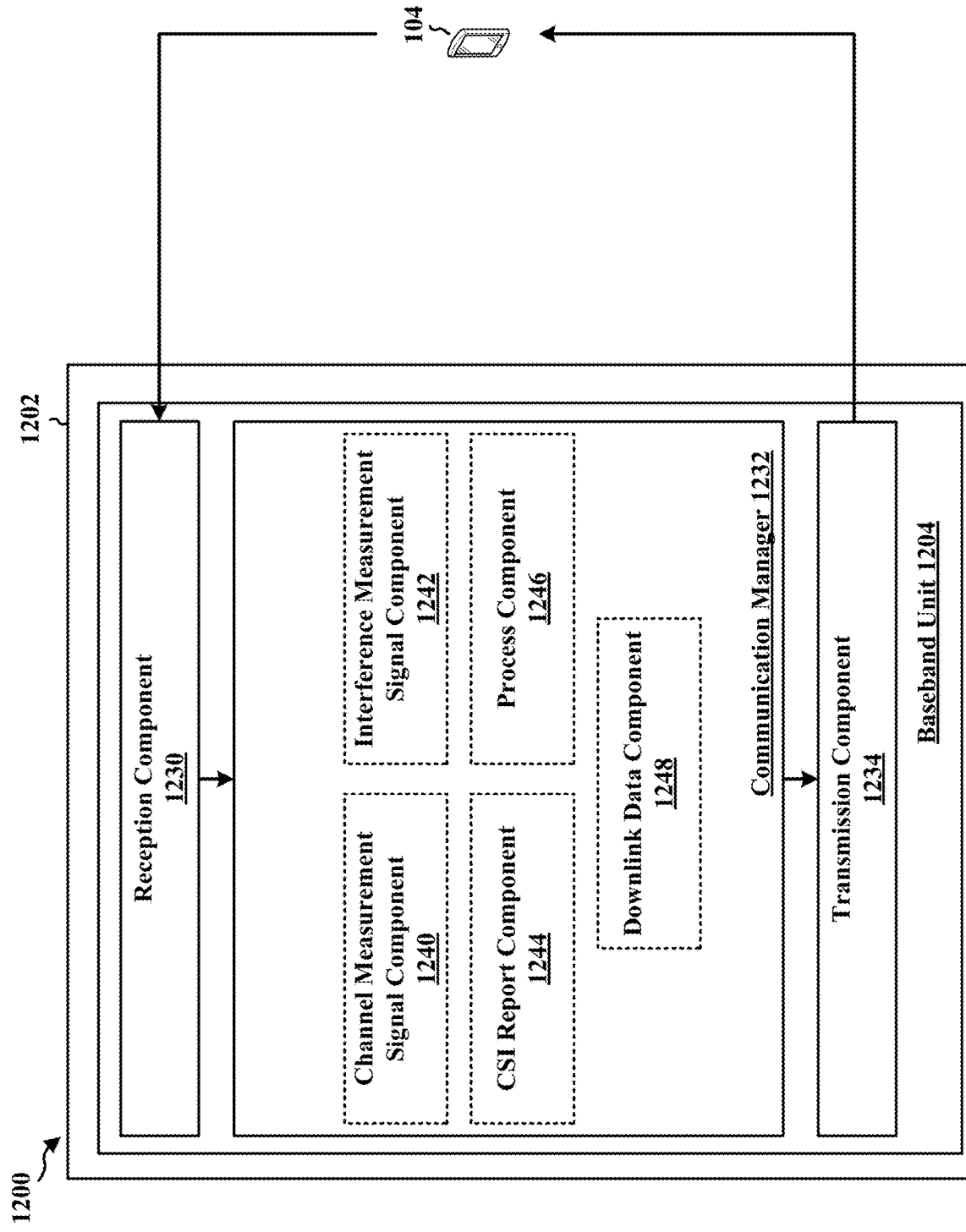
FIG. 12 is a diagram illustrating another example of a hardware implementation for another example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a channel measurement signal component 1240 that sends a channel measurement signal to the UE, e.g., as described in connection with 1102. The communication manager 1232 further includes an interference measurement signal component 1242 that sends an IM signal to the UE, e.g., as described in connection with 1104. The communication manager 1232 further includes a CSI report component 1244 that obtains a CSI report from the UE, where the CSI report further includes an expiration time for the CSI report, e.g., as described in connection with 1106. The CSI report may include CSI based on the channel measurement signal, and the expiration time may be based on the IM signal. The communication manager 1232 further includes a process component 1246 that processes downlink data for transmission based on the expiration time in the CSI report, e.g., as described in connection with 1108. The communication manager 1232 further includes a downlink data component 1248 that sends the downlink data after receiving the CSI report, e.g., as described in connection with 1110.

The apparatus may include additional components that perform each of the blocks of the algorithm in the aforementioned flowcharts of FIGS. 8 and 11. As such, each block in the aforementioned flowcharts of FIGS. 8 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for obtaining a CSI report from the UE, where the CSI report further includes an expiration time for the CSI report; and means for processing downlink data for transmission based on the expiration time in the CSI report.

In one configuration, the apparatus 1202, and in particular the baseband unit 1204, may include means for sending a channel measurement signal to the UE, where the CSI report includes CSI based on the channel measurement signal.

In one configuration, the apparatus 1202, and in particular the baseband unit 1204, may include means for sending the downlink data after receiving the CSI report.

In one configuration, the apparatus 1202, and in particular the baseband unit 1204, may include means for sending an IM signal to the UE, where the expiration time is based on the IM signal.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: obtaining a channel measurement signal from a base station; identifying channel state information (CSI) based on the channel measurement signal; and providing a CSI report to the base station including the CSI, wherein the CSI report further includes an expiration time for the CSI report.

Example 2 is the method of Example 1, wherein the channel measurement signal comprises one of CSI-RS, DMRS, or a signal on a physical downlink shared channel (PDSCH).

Example 3 is the method of any of Examples 1 and 2, wherein the CSI report is provided periodically on a physical uplink control channel (PUCCH), semi-persistently on one of the PUCCH or a physical uplink shared channel (PUSCH), or aperiodically on the PUSCH in response to an uplink grant.

Example 4 is the method of any of Examples 1 and 2, wherein the CSI report is provided aperiodically on a physical uplink control channel (PUCCH) in response to a downlink grant.

Example 5 is the method of any of Examples 1 to 4, further comprising: obtaining downlink data after providing the CSI report.

Example 6 is the method of Example 5, wherein the downlink data is obtained based on the CSI report when a difference between a base station reception time of the CSI report and a base station transmission time of the downlink data does not exceed the expiration time.

Example 7 is the method of Example 5, wherein the downlink data is obtained based on parameters other than in the CSI report when a difference between a base station reception time of the CSI report and a base station transmission time of the downlink data meets or exceeds the expiration time.

Example 8 is the method of any of Examples 1 to 7, further comprising: determining the expiration time based on an interference measurement (IM) signal from the base station.

Example 9 is the method of any of Examples 1 to 8, wherein the expiration time is determined based on a correlation of interference in relation to a threshold.

Example 10 is the method of Example 9, wherein the expiration time is determined to be a time where the correlation of interference is equal to the threshold.

Example 11 is an apparatus for wireless communication, comprising: a processor; memory coupled with the processor; and instructions stored in the memory and operable, when executed by the processor, to cause the apparatus to: obtain a channel measurement signal from a base station; identify channel state information (CSI) based on the channel measurement signal; and provide a CSI report to the base station including the CSI, wherein the CSI report further includes an expiration time for the CSI report.

Example 12 is the apparatus of Example 11, wherein the channel measurement signal comprises one of CSI-RS, DMRS, or a signal on a physical downlink shared channel (PDSCH).

Example 13 is the apparatus of any of Examples 11 and 12, wherein the CSI report is provided periodically on a physical uplink control channel (PUCCH), semi-persistently on one of the PUCCH or a physical uplink shared channel (PUSCH), or aperiodically on the PUSCH in response to an uplink grant.

Example 14 is the apparatus of any of Examples 11 and 12, wherein the CSI report is provided aperiodically on a physical uplink control channel (PUCCH) in response to a downlink grant.

Example 15 is the apparatus of any of Examples 11 to 14, wherein the instructions, when executed by the processor, further cause the apparatus to: obtain downlink data after providing the CSI report.

Example 16 is the apparatus of Example 15, wherein the downlink data is obtained based on the CSI report when a difference between a base station reception time of the CSI report and a base station transmission time of the downlink data does not exceed the expiration time.

Example 17 is the apparatus of Example 15, wherein the downlink data is obtained based on parameters other than in the CSI report when a difference between a base station reception time of the CSI report and a base station transmission time of the downlink data meets or exceeds the expiration time.

Example 18 is the apparatus of any of Examples 11 to 17, wherein the instructions, when executed by the processor, further cause the apparatus to: determine the expiration time based on an interference measurement (IM) signal from the base station.

Example 19 is the apparatus of any of Examples 11 to 18, wherein the expiration time is determined based on a correlation of interference in relation to a threshold.

Example 20 is the apparatus of Example 19, wherein the expiration time is determined to be a time where the correlation of interference is equal to the threshold.

Example 21 is an apparatus for wireless communication, comprising: means for receiving a channel measurement signal from a base station; means for identifying channel state information (CSI) based on the channel measurement signal; and means for providing a CSI report to the base station including the CSI, wherein the CSI report further includes an expiration time for the CSI report.

Example 22 is the apparatus of Example 21, wherein the channel measurement signal comprises one of CSI-RS, DMRS, or a signal on a physical downlink shared channel (PDSCH).

Example 23 is the apparatus of any of Examples 21 and 22, wherein the CSI report is provided periodically on a physical uplink control channel (PUCCH), semi-persistently on one of the PUCCH or a physical uplink shared channel (PUSCH), or aperiodically on the PUSCH in response to an uplink grant.

Example 24 is the apparatus of any of Examples 21 and 22, wherein the CSI report is provided aperiodically on a physical uplink control channel (PUCCH) in response to a downlink grant.

Example 25 is the apparatus of any of Examples 21 to 24, wherein the means for receiving is further configured to receive downlink data after providing the CSI report.

Example 26 is the apparatus of Example 25, wherein the downlink data is received based on the CSI report when a difference between a base station reception time of the CSI report and a base station transmission time of the downlink data does not exceed the expiration time.

Example 27 is the apparatus of Example 25, wherein the downlink data is received based on parameters other than in the CSI report when a difference between a base station reception time of the CSI report and a base station transmission time of the downlink data exceeds the expiration time.

Example 28 is the apparatus of any of Examples 21 to 27, further comprising means for determining the expiration time based on an interference measurement (IM) signal received from the base station.

Example 29 is the apparatus of any of Examples 21 to 28, wherein the expiration time is determined based on a correlation of interference in relation to a threshold.

Example 30 is the apparatus of Example 29, wherein the expiration time is determined to be a time where the correlation of interference is equal to the threshold.

Example 31 is a computer-readable medium storing computer executable code, the code when executed by a processor cause the processor to: receive a channel measurement signal from a base station; identify channel state information (CSI) based on the channel measurement signal; and provide a CSI report to the base station including the CSI, wherein the CSI report further includes an expiration time for the CSI report.

Example 32 is a method of wireless communication at a base station, comprising: obtaining a channel state information (CSI) report from the UE, wherein the CSI report further includes an expiration time for the CSI report; and processing downlink data for transmission based on the expiration time in the CSI report.

Example 33 is the method of Example 32, further comprising: sending a channel measurement signal to the UE, wherein the CSI report includes CSI based on the channel measurement signal, and wherein the channel measurement signal comprises one of CSI-RS, DMRS, or a signal on a physical downlink shared channel (PDSCH).

Example 34 is the method of any of Examples 32 and 33, wherein the CSI report is obtained periodically on a physical uplink control channel (PUCCH), semi-persistently on one of the PUCCH or a physical uplink shared channel (PUSCH), or aperiodically on the PUSCH in response to an uplink grant.

Example 35 is the method of any of Examples 32 and 33, wherein the CSI report is obtained aperiodically on a physical uplink control channel (PUCCH) in response to a downlink grant.

Example 36 is the method of any of Examples 32 to 35, further comprising: sending the downlink data after obtaining the CSI report.

Example 37 is the method of any of Examples 32 to 36, wherein the downlink data is processed based on the CSI report when a difference between a base station reception time of the CSI report and a base station transmission time of the downlink data does not exceed the expiration time.

Example 38 is the method of any of Examples 32 to 36, wherein the downlink data is processed based on parameters other than in the CSI report when a difference between a base station reception time of the CSI report and a base station transmission time of the downlink data meets or exceeds the expiration time.

Example 39 is the method of any of Examples 32 to 38, further comprising: sending an interference measurement (IM) signal to the UE, wherein the expiration time is based on the IM signal.

Example 40 is the method of any of Examples 32 to 39, wherein the expiration time is further based on a correlation of interference in relation to a threshold.

Example 41 is the method of Example 40, wherein the expiration time is a time where the correlation of interference is equal to the threshold.

Example 42 is an apparatus for wireless communication, comprising: a processor; memory coupled with the processor; and instructions stored in the memory and operable, when executed by the processor, to cause the apparatus to: obtain a channel state information (CSI) report from the UE, wherein the CSI report further includes an expiration time for the CSI report; and process downlink data for transmission based on the expiration time in the CSI report.

Example 43 is the apparatus of Example 42, wherein the instructions, when executed by the processor, further cause the apparatus to: send a channel measurement signal to the UE, wherein the CSI report includes CSI based on the channel measurement signal, and wherein the channel measurement signal comprises one of CSI-RS, DMRS, or a signal on a physical downlink shared channel (PDSCH).

Example 44 is the apparatus of any of Examples 42 and 43, wherein the CSI report is obtained periodically on a physical uplink control channel (PUCCH), semi-persistently on one of the PUCCH or a physical uplink shared channel (PUSCH), or aperiodically on the PUSCH in response to an uplink grant.

Example 45 is the apparatus of any of Examples 42 and 43, wherein the CSI report is obtained aperiodically on a physical uplink control channel (PUCCH) in response to a downlink grant.

Example 46 is the apparatus of any of Examples 42 to 45, wherein the instructions, when executed by the processor, further cause the apparatus to: send the downlink data after obtaining the CSI report.

Example 47 is the apparatus of any of Examples 42 to 46, wherein the downlink data is processed based on the CSI report when a difference between a base station reception time of the CSI report and a base station transmission time of the downlink data does not exceed the expiration time.

Example 48 is the apparatus of any of Examples 42 to 46, wherein the downlink data is processed based on parameters other than in the CSI report when a difference between a base station reception time of the CSI report and a base station transmission time of the downlink data meets or exceeds the expiration time.

Example 49 is the apparatus of any of Examples 42 to 48, wherein the instructions, when executed by the processor, further cause the apparatus to: send an interference measurement (IM) signal to the UE, wherein the expiration time is based on the IM signal.

Example 50 is the apparatus of any of Examples 42 to 49, wherein the expiration time is further based on a correlation of interference in relation to a threshold.

Example 51 is the apparatus of Example 50, wherein the expiration time is a time where the correlation of interference is equal to the threshold.

Example 52 is an apparatus for wireless communication, comprising: means for receiving a channel state information (CSI) report from the UE, wherein the CSI report further includes an expiration time for the CSI report; and means for processing downlink data for transmission based on the expiration time in the CSI report.

Example 53 is the apparatus of Example 52, further comprising: means for transmitting a channel measurement signal to the UE, wherein the CSI report includes CSI based on the channel measurement signal, and wherein the channel measurement signal comprises one of CSI-RS, DMRS, or a signal on a physical downlink shared channel (PDSCH).

Example 54 is the apparatus of any of Examples 52 and 53, wherein the CSI report is received periodically on a physical uplink control channel (PUCCH), semi-persistently on one of the PUCCH or a physical uplink shared channel (PUSCH), or aperiodically on the PUSCH in response to an uplink grant.

Example 55 is the apparatus of any of Examples 52 and 53, wherein the CSI report is received aperiodically on a physical uplink control channel (PUCCH) in response to a downlink grant.

Example 56 is the apparatus of any of Examples 52 to 55, further comprising: means for transmitting the downlink data after receiving the CSI report.

Example 57 is the apparatus of any of Examples 52 to 56, wherein the downlink data is processed based on the CSI report when a difference between a base station reception time of the CSI report and a base station transmission time of the downlink data does not exceed the expiration time.

Example 58 is the apparatus of any of Examples 52 to 56, wherein the downlink data is processed based on parameters other than in the CSI report when a difference between a base station reception time of the CSI report and a base station transmission time of the downlink data exceeds the expiration time.

Example 59 is the apparatus of any of Examples 52 to 58, further comprising: means for transmitting an interference measurement (IM) signal to the UE, wherein the expiration time is based on the IM signal.

Example 60 is the apparatus of any of Examples 52 to 59, wherein the expiration time is further based on a correlation of interference in relation to a threshold.

Example 61 is the apparatus of Example 60, wherein the expiration time is a time where the correlation of interference is equal to the threshold.

Example 62 is a computer-readable medium storing computer executable code, the code when executed by a processor cause the processor to: receive a channel state information (CSI) report from the UE, wherein the CSI report further includes an expiration time for the CSI report; and process downlink data for transmission based on the expiration time in the CSI report.

What is claimed is:

1. A method of wireless communication at a user equipment (UE), comprising:
   obtaining a channel measurement signal from a base station;
   identifying channel state information (CSI) based on the channel measurement signal; and
   providing an unexpired CSI report to the base station including the CSI, wherein the unexpired CSI report further includes a UE determined expiration time for the unexpired CSI report at which time the unexpired CSI report is to become an expired CSI report.

2. The method of claim 1, wherein the channel measurement signal comprises one of CSI-RS, DMRS, or a signal on a physical downlink shared channel (POSCH).

3. The method of claim 1, wherein the unexpired CSI report is provided periodically on a physical uplink control channel (PUCCH), semi-persistently on one of the PUCCH or a physical uplink shared channel (PUSCH), or aperiodically on the PUSCH in response to an uplink grant.

4. The method of claim 1, wherein the unexpired CSI report is provided aperiodically on a physical uplink control channel (PUCCH) in response to a downlink grant.

5. The method of claim 1, further comprising:
   obtaining downlink data after providing the unexpired CSI report.

6. The method of claim 5, wherein the downlink data is obtained based on the unexpired CSI report when a difference between a base station reception time of the unexpired CSI report and a base station transmission time of the downlink data does not exceed the expiration time.

7. The method of claim 5, wherein the downlink data is obtained based on parameters other than in the unexpired CSI report when a difference between a base station reception time of the unexpired CSI report and a base station transmission time of the downlink data meets or exceeds the expiration time.

8. The method of claim 1, further comprising:
   determining the expiration time based on an interference measurement (IM) signal from the base station.

9. The method of claim 8, wherein the expiration time is determined based on a correlation of interference in relation to a threshold.

10. The method of claim 9, wherein the expiration time is determined to be a time where the correlation of interference is equal to the threshold.

11. An apparatus for wireless communication, comprising:
    a processor;
    memory coupled with the processor; and
    instructions stored in the memory and operable, when executed by the processor, to cause the apparatus to:
      obtain a channel measurement signal from a base station;
      identify channel state information (CSI) based on the channel measurement signal; and
      provide an unexpired CSI report to the base station including the CSI, wherein the unexpired CSI report further includes a user equipment determined expiration time for the unexpired CSI report at which time the unexpired CSI report is to become an expired CSI report.

12. The apparatus of claim 11, wherein the instructions, when executed by the processor, further cause the apparatus to:
    obtain downlink data after providing the unexpired CSI report.

13. The apparatus of claim 12, wherein the downlink data is obtained based on the unexpired CSI report when a difference between a base station reception time of the unexpired CSI report and a base station transmission time of the downlink data does not exceed the expiration time.

14. The apparatus of claim 12, wherein the downlink data is obtained based on parameters other than in the unexpired CSI report when a difference between a base station reception time of the unexpired CSI report and a base station transmission time of the downlink data meets or exceeds the expiration time.

15. The apparatus of claim 11, wherein the instructions, when executed by the processor, further cause the apparatus to:
determine the expiration time based on an interference measurement (IM) signal received from the base station.

16. The apparatus of claim 15, wherein the expiration time is determined based on a correlation of interference in relation to a threshold.

17. A method of wireless communication at a base station, comprising:
obtaining an unexpired channel state information (CSI) report from a user equipment (UE), wherein the unexpired CSI report further includes a UE determined expiration time for the unexpired CSI report at which time the unexpired CSI report is to become an expired CSI report; and
processing downlink data for transmission based on the expiration time in the unexpired CSI report.

18. The method of claim 17, further comprising:
sending a channel measurement signal to the UE, wherein the unexpired CSI report includes CSI based on the channel measurement signal, and wherein the channel measurement signal comprises one of CSI-RS, DMRS, or a signal on a physical downlink shared channel (PDSCH).

19. The method of claim 17, wherein the unexpired CSI report is obtained periodically on a physical uplink control channel (PUCCH), semi-persistently on one of the PUCCH or a physical uplink shared channel (PUSCH), or aperiodically on the PUSCH in response to an uplink grant.

20. The method of claim 17, wherein the unexpired CSI report is obtained aperiodically on a physical uplink control channel (PUCCH) in response to a downlink grant.

21. The method of claim 17, further comprising:
sending the downlink data after obtaining the unexpired CSI report.

22. The method of claim 21, wherein the downlink data is processed based on the unexpired CSI report when a difference between a base station reception time of the unexpired CSI report and a base station transmission time of the downlink data does not exceed the expiration time.

23. The method of claim 21, wherein the downlink data is processed based on parameters other than in the unexpired CSI report when a difference between a base station reception time of the unexpired CSI report and a base station transmission time of the downlink data meets or exceeds the expiration time.

24. The method of claim 17, further comprising:
sending an interference measurement (IM) signal to the UE, wherein the expiration time is based on the IM signal.

25. The method of claim 24, wherein the expiration time is further based on a correlation of interference in relation to a threshold.

26. The method of claim 25, wherein the expiration time is a time where the correlation of interference is equal to the threshold.

27. An apparatus for wireless communication, comprising:
a processor;
memory coupled with the processor; and
instructions stored in the memory and operable, when executed by the processor, to cause the apparatus to:
obtain an unexpired channel state information (CSI) report from a user equipment (UE), wherein the unexpired CSI report further includes a UE determined expiration time for the unexpired CSI report at which time the unexpired CSI report is to become an expired CSI report; and
process downlink data for transmission based on the expiration time in the CSI report.

28. The apparatus of claim 27, wherein the instructions, when executed by the processor, further cause the apparatus to:
send an interference measurement (IM) signal to the UE, wherein the expiration time is based on the IM signal.

29. The apparatus of claim 28, wherein the expiration time is further based on a correlation of interference in relation to a threshold.

30. The apparatus of claim 29, wherein the expiration time is a time where the correlation of interference is equal to the threshold.

* * * * *